United States Patent
Malin

(10) Patent No.: US 10,772,320 B2
(45) Date of Patent: Sep. 15, 2020

(54) AUTOMATIC BLOOD BANK

(71) Applicant: LICONIC AG, Mauren (LI)

(72) Inventor: Cosmas Malin, Mauren (LI)

(73) Assignee: LICONIC AG, Mauren (LI)

( * ) Notice: Subject to any disclaimer, the term of this patent is extended or adjusted under 35 U.S.C. 154(b) by 0 days.

(21) Appl. No.: 16/010,072

(22) Filed: Jun. 15, 2018

(65) Prior Publication Data

US 2018/0360024 A1   Dec. 20, 2018

(30) Foreign Application Priority Data

Jun. 16, 2017 (CH) ........................................ 786/17

(51) Int. Cl.
| | |
|---|---|
| F25D 25/00 | (2006.01) |
| A01N 1/02 | (2006.01) |
| F25D 13/06 | (2006.01) |
| F25D 31/00 | (2006.01) |
| F25D 3/10 | (2006.01) |
| G05B 19/416 | (2006.01) |

(52) U.S. Cl.
CPC ......... *A01N 1/0257* (2013.01); *A01N 1/0242* (2013.01); *A01N 1/0252* (2013.01); *F25D 3/105* (2013.01); *F25D 13/06* (2013.01); *F25D 25/00* (2013.01); *F25D 31/001* (2013.01); *G05B 19/416* (2013.01); *F25D 2400/30* (2013.01); *F25D 2500/06* (2013.01); *G05B 2219/45083* (2013.01)

(58) Field of Classification Search
CPC .................................. B65G 1/12; B65G 1/133
USPC .... 414/285, 331.01, 331.02, 331.03, 331.04, 414/331.05
See application file for complete search history.

(56) References Cited

U.S. PATENT DOCUMENTS

| | | | | |
|---|---|---|---|---|
| 5,435,685 A * | 7/1995 | Tsuda | .................... | B65G 1/0478 414/331.03 |
| 5,860,784 A * | 1/1999 | Schuitema | ........... | B65G 1/0407 414/280 |
| 6,728,597 B2 * | 4/2004 | Didriksen | ................ | B65G 1/00 414/270 |
| 7,314,341 B2 * | 1/2008 | Malin | .................... | B65G 1/045 414/331.02 |
| 7,527,139 B2 * | 5/2009 | Hasenfratz | ........... | B65G 1/0435 198/347.2 |

(Continued)

FOREIGN PATENT DOCUMENTS

| | | |
|---|---|---|
| DE | 10 2007 052 014 | 5/2009 |
| EP | 2 208 951 | 7/2010 |
| WO | 2017/049416 | 3/2017 |

OTHER PUBLICATIONS

EP Search Report issued in EP 18177679 and dated Oct. 16, 2018 (9 pages).

*Primary Examiner* — Kaitlin S Joerger
(74) *Attorney, Agent, or Firm* — Greenblum & Bernstein, P.L.C.

(57) ABSTRACT

The blood bank comprises a cooled storage area with a plurality of stationary storage racks. Further, it comprises a buffer storage, which holds a number of movable storage racks. A robot is provided for moving blood products between the stationary storage racks and the movable storage racks. A product access door is arranged close to the buffer storage for manual access to the blood products within the movable storage racks.

20 Claims, 4 Drawing Sheets

(56) References Cited

U.S. PATENT DOCUMENTS

| | | | |
|---|---|---|---|
| 7,635,246 B2* | 12/2009 | Neeper | G01N 35/00732 |
| | | | 414/280 |
| 8,694,153 B2* | 4/2014 | Koch | G01N 35/0099 |
| | | | 221/9 |
| 8,857,208 B2* | 10/2014 | Malin | F25D 25/04 |
| | | | 62/440 |
| 9,174,790 B2* | 11/2015 | Malin | B65D 81/38 |
| RE45,967 E* | 4/2016 | Owen | A01N 1/02 |
| 9,310,119 B2* | 4/2016 | Fuhr | A01N 1/0252 |
| 9,709,314 B2* | 7/2017 | Malin | F25D 13/06 |
| 9,995,525 B2 | 6/2018 | Malin | |
| 10,124,341 B2* | 11/2018 | Malin | B01L 7/50 |
| 2003/0019228 A1* | 1/2003 | Bilyeu | F25D 13/04 |
| | | | 62/229 |
| 2008/0213080 A1* | 9/2008 | Cachelin | B65G 1/127 |
| | | | 414/791.6 |
| 2008/0272674 A1 | 11/2008 | Malin | |
| 2009/0026905 A1 | 1/2009 | Malin | |
| 2010/0028214 A1 | 2/2010 | Howard | |
| 2012/0060520 A1* | 3/2012 | Collins | F17C 3/085 |
| | | | 62/62 |
| 2012/0060539 A1 | 3/2012 | Collins | |
| 2012/0060541 A1 | 3/2012 | Collins | |
| 2016/0082440 A1 | 3/2016 | Malin | |
| 2018/0055043 A1* | 3/2018 | Aota | A01N 1/0268 |
| 2018/0272353 A1 | 9/2018 | Malin | |

\* cited by examiner

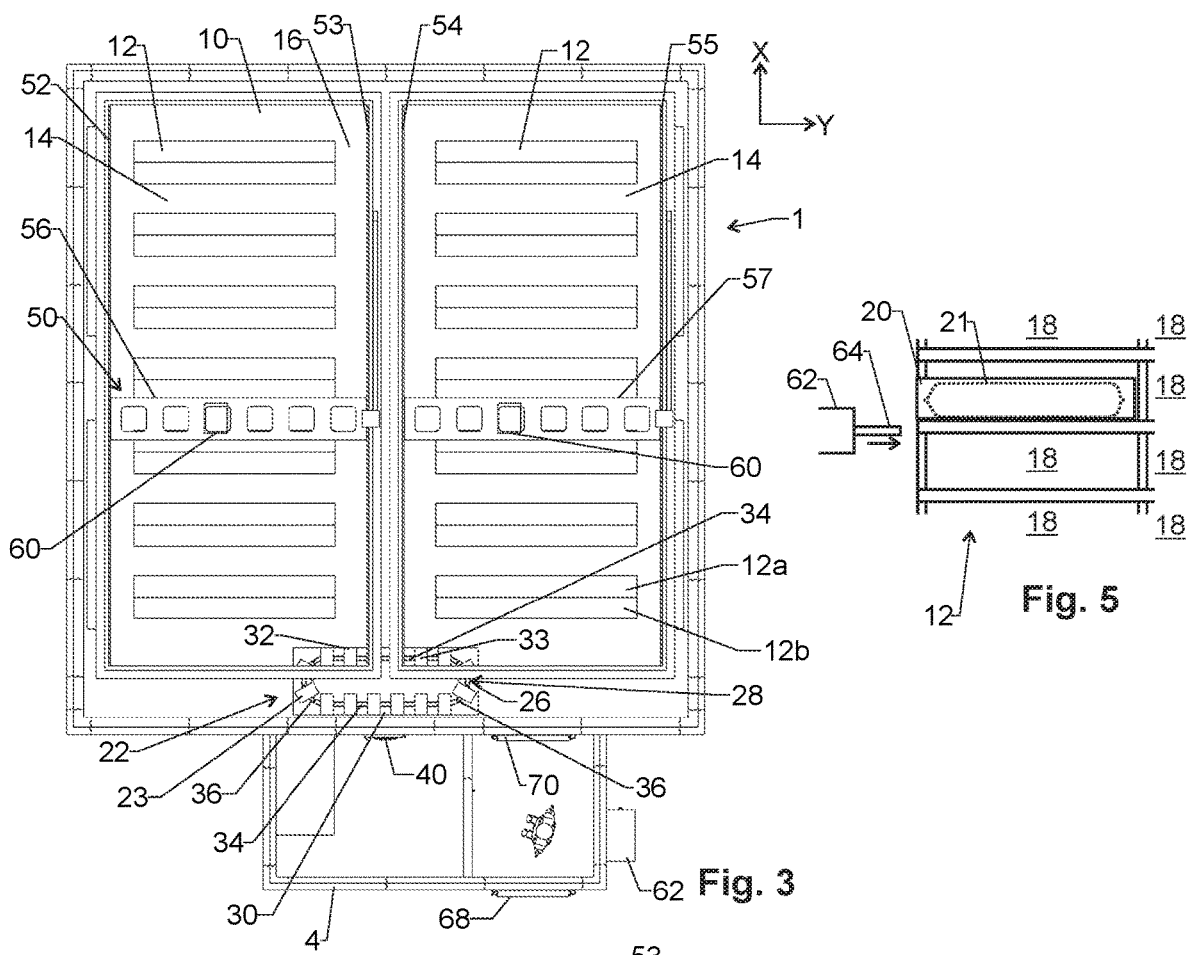

AUTOMATIC BLOOD BANK

CROSS REFERENCES TO RELATED APPLICATIONS

This application claims the priority of Swiss patent application CH 00786/17, filed 16 Jun. 2017, the disclosure of which is incorporated herein by reference in its entirety.

TECHNICAL FIELD

The invention relates to a blood bank comprising a storage area for storing blood products. In particular, it relates to a blood bank that allows automatic access to the blood products.

The invention also relates to a method for operating such a blood bank.

BACKGROUND ART

Modern blood banks have to be able to store a large number of blood products. Typically, the individual products are provided in blood containers, such as blood bags or bottles.

The blood containers are stored in stationary storage racks and the user accesses them manually. Alternatively, simple carousels can be used for storage.

DISCLOSURE OF THE INVENTION

It is an object of the present invention to provide a blood bank and a method for its operation suitable to store a large number of blood containers and to access them individually and automatically.

This object is achieved by a blood bank comprising
a housing,
a storage area arranged in said housing,
a refrigerator device attributed to said storage area,
a plurality of stationary storage racks arranged in said storage area, each stationary storage rack comprising a plurality of permanent storage locations for blood containers arranged above each other,
a product access door arranged in a wall of said housing,
an automated transport device adapted and structured to transport blood containers between said product access door and said permanent storage locations,
wherein said transport device comprises
a buffer storage arranged in said storage area at said product access door, wherein said buffer storage comprises a plurality of movable storage racks, each movable storage rack having a plurality of temporary, movable storage locations for blood containers arranged above each other, and
a robot movable between said movable storage racks and said stationary storage racks for transporting blood products between said temporary, movable storage locations and said permanent storage locations.

Accordingly, the blood bank comprises the following items:
A housing: The housing encloses the main components of the blood bank.
A storage area: This is the area where the blood products are stored. It is arranged in the housing.
A refrigerator device: The refrigerator device is attributed to said storage area, and it is adapted and structured to cool the items in the storage area. Advantageously, the refrigerator device is adapted and structured to cool said storage area to a temperature below 0° C., in particular below −20° C., typically below −27° C. (e.g. −30° C.), e.g. between −20° C. and −40° C.
A plurality of stationary storage racks arranged in said storage area: Each stationary storage rack comprises a plurality of permanent storage locations for blood containers arranged above each other.
A product access door arranged in a wall of said housing: This door can be used to insert blood containers into the blood bank or to retrieve the containers therefrom.
An automated transport device: This transport device is adapted and structured to transport blood containers between said product access door and said permanent storage locations,
The transport device comprises the following parts:
A buffer storage: The buffer storage is arranged in said storage area, i.e. in the cooled part of the housing. It is located at the product access door, i.e. at least part of it can be accessed through the product access door. It comprises a plurality of movable storage racks, each movable storage rack having a plurality of temporary, movable storage locations for blood containers arranged above each other.
A robot movable between said movable storage racks and said stationary storage racks: The robot can be used for transporting blood containers between the temporary, movable storage locations and the permanent storage locations.

This blood bank can be used to store a large number of blood products. The robot is able to access the products in automatic manner. The buffer storage allows to increase the throughput when adding products to the storage or when retrieving the same therefrom because the products can be temporarily stored in the buffer storage, thereby compensating the potentially large access time of the robot.

Advantageously, the buffer storage comprises a displacement device for moving the movable storage racks between at least one first location adjacent to the product access door and at least one second location. The robot can be moved to access blood containers in the temporary, movable storage locations of the movable storage rack(s) at the second location(s). In this manner, a movable storage rack located adjacent to the product access door can be moved away quickly, e.g. when full, in order to be replaced by another storage rack.

Advantageously, the blood bank comprises a plurality of carriers, with each carrier being adapted and structured to receive a single blood container. The storage locations of the storage racks are each adapted to receive a single such carrier with a blood container therein. The robot is adapted and structured to transport at least one of said carriers with its blood container between one of the movable storage racks and one of the stationary storage racks.

In another aspect, the invention also relates to a method for operating such a blood bank. This method comprises the step of using said buffer storage as temporary intermediate storage for said blood products while maintaining a faster rate of transfer of the blood products through said product access door than between said buffer storage and said stationary storage racks.

Other advantageous embodiments are listed in the dependent claims as well as in the description below.

BRIEF DESCRIPTION OF THE DRAWINGS

The invention will be better understood and objects other than those set forth above will become apparent from the following detailed description thereof. Such description makes reference to the annexed drawings, wherein:

FIG. 3 shows a top view of the blood bank of FIG. 1 with its roof removed, FIG. 4 shows another view the blood bank of FIG. 1, FIG. 5 shows a single carrier in a storage rack and part of the robot accessing it.

MODES FOR CARRYING OUT THE INVENTION

Definitions

The term "blood product" is used to refer to a product typically stored in a blood bank. Advantageously, a "blood product" is to be understood as comprising the following types of products: Plasma, platelets, whole blood, red blood cells, and blood.

The products are typically stored in bags for larger amounts, but embodiments of the present blood bank can, in addition thereto, also store monitoring tubes with volumes of less than 10 ml or archival tubes with volumes of approximately 1 ml.

Blood Bank, First Embodiment

Figure 1:
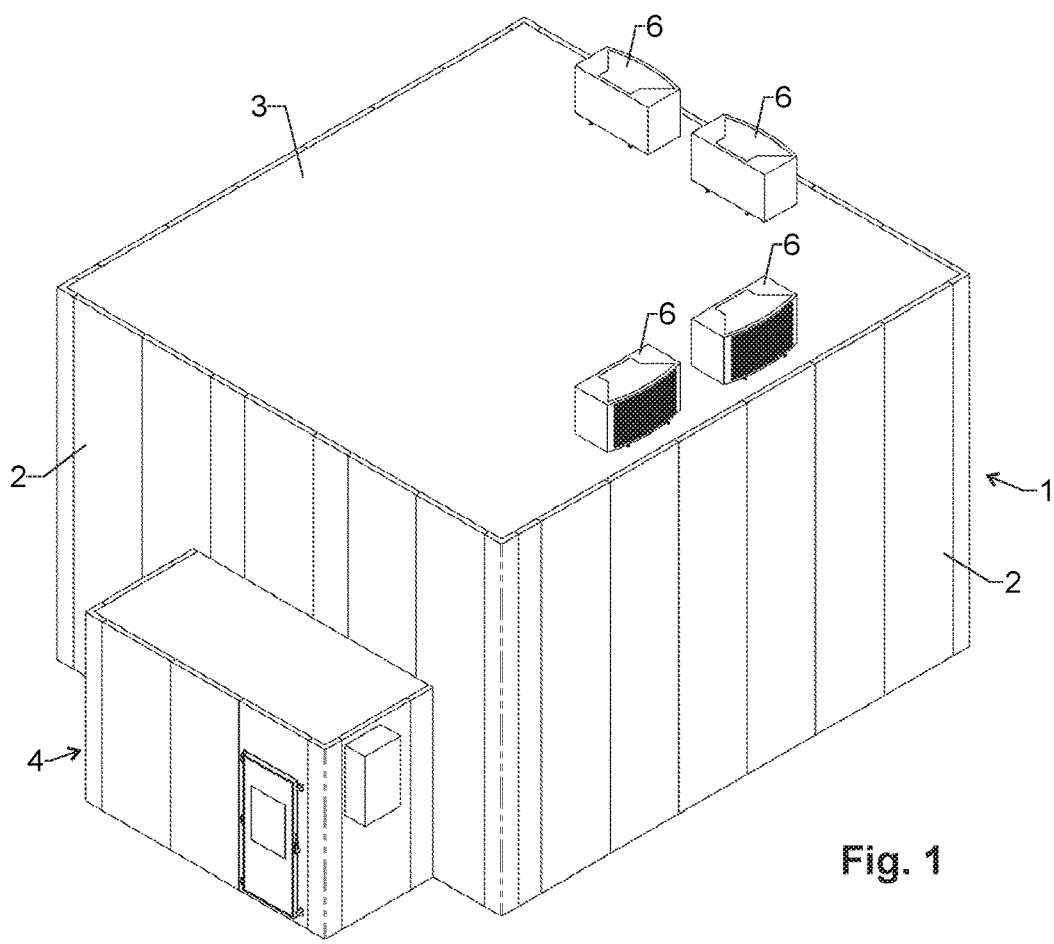
FIG. 1 shows the housing of a first embodiment of a blood bank.

The blood bank of FIG. 1 comprises a housing 1 having insulated side walls 2 and an insulated top wall 3. Further, it comprises an access cabinet 4 located at a side wall 2.

The blood bank further comprises a refrigerator device 6, of which the warm-side heat exchangers can be seen in FIG. 1.

Figure 2:
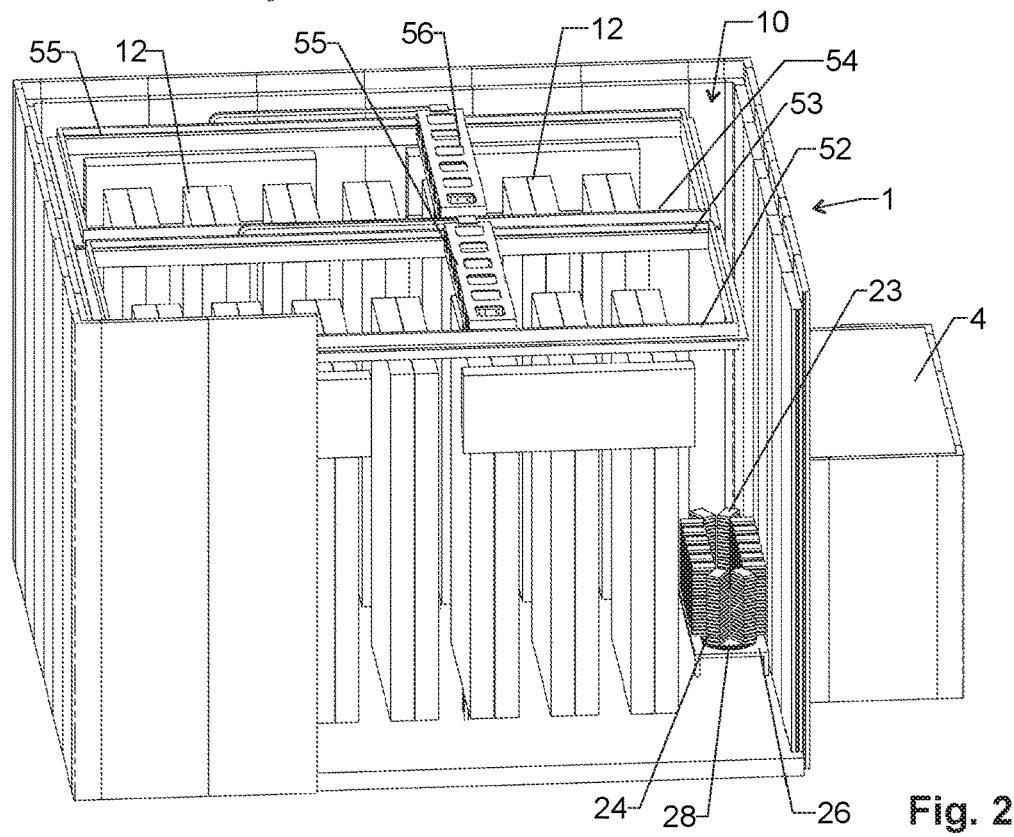
FIG. 2 shows the blood bank of FIG. 1 with part of its walls removed.

As can be seen in FIGS. 2-4, housing 1 encloses a storage area 10. Refrigerator device 6 is adapted and structured to maintain a temperature of less than 0° C., in particular of less than −20° C., within storage area 10. Typically, the temperature in storage area 10 is maintained at −27° C. or less, e.g. at −30° C.

Storage area 10 receives a number of stationary storage racks 12. As can best seen in FIG. 3, the stationary storage racks 12 are arranged in rows (along direction X of FIG. 3) and columns (along direction Y of FIG. 3). In each row, the stationary storage racks 12 are separated by corridors 14 (extending along direction Y), while the rows themselves are separated by an aisle 16 (extending along direction X).

Advantageously, there are at least two rows of stationary storage racks 12, with each row holding at least three stationary storage racks 12. In a particularly advantageous embodiment, there are exactly two rows separated by a single aisle 16.

As shown in FIG. 5, each stationary storage rack 12 comprises a plurality of permanent storage locations 18 arranged on top of each other as well as side by side of each other.

Each permanent storage location 18 is adapted to receive a single carrier 20 comprising a blood product 21. Blood product 21 can, for example, be a pouch or a bottle. Carrier 20 can, for example, be a box or a frame with an open top and a closed bottom.

The blood product 21 and/or the carrier 20 advantageously has a capacity of at least 100 ml, in particular of at least 400 ml. Typical configurations use blood product bags, in particular blood product bags having a capacity of 500 ml and being filled with blood product of e.g. 250-300 ml or having a capacity of 1000 ml and being filled with blood product of 600-800 ml.

In the embodiment shown here, each stationary storage rack 12 comprises a first half 12a second half 12b of basically identical design (FIG. 3), facing opposite directions and being accessible from neighboring corridors 14.

Figure 6:
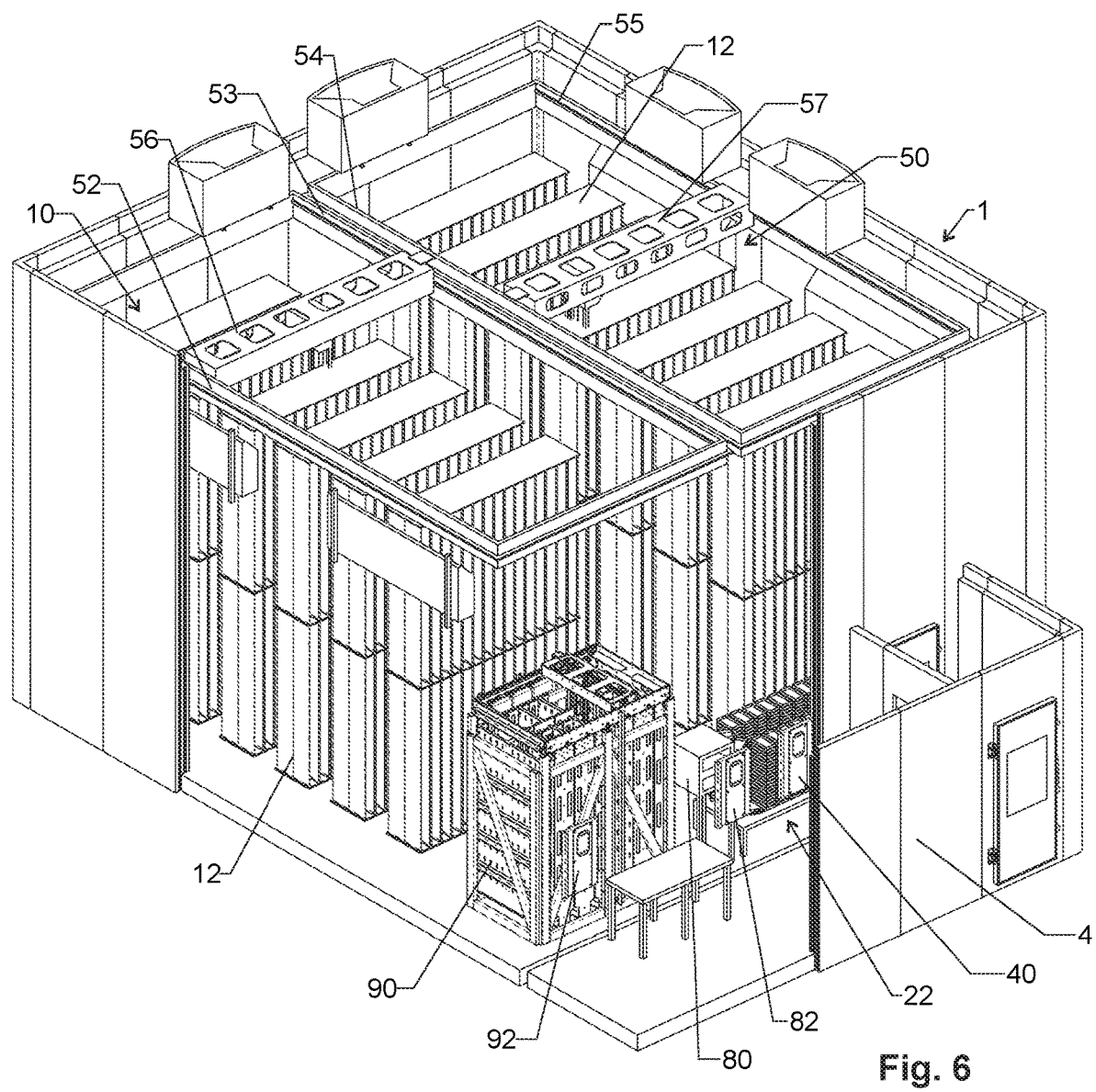
FIG. 6 shows a second embodiment of a blood bank with some of its walls removed.

Blood bank 1 further comprises, as shown in FIGS. 3 and 6, a buffer storage 22 located at the end of aisle 16. Buffer storage 22 is also arranged in storage area 10, i.e. it is maintained at low temperature.

Buffer storage 22 comprises a plurality of movable storage racks 23. As can be seen from FIG. 2, each movable storage rack 23 comprises a plurality of temporary, movable storage locations 24 located above each other. Each movable storage location 24 provides room for one carrier 20 with a blood product 21, similar to the stationary storage locations 18 shown in FIG. 5.

As shown in FIGS. 2 and 3, the movable storage racks 23 are mounted to a displacement device 26, which is adapted and structured to move the movable storage racks 23 along a looped path 28 between a first location 30 and two second locations 32, 33.

Looped path 28 advantageously comprises two straight sections 34 joined at their ends by curved sections 36 (FIG. 3) in order to exploit the narrow space between the stationary storage racks 12 and the side wall of housing 1.

First location 30 is adjacent to a product access door 40 arranged in a side wall to of housing 1. When product access door 40 is open, the user can access the carriers 20 and therefore the blood products 21 in at least one of the movable storage racks 23 in first location 30.

In buffer storage 22, first location 30 is opposite the second locations 32, 33 such that first location 30 is facing outwards, towards product access door 40, while second locations 32, 33 are facing inwards, towards the stationary storage racks 12.

The blood bank further comprises a robot that is generally designated with reference number 50. Robot 50 is adapted and structured to move the carriers 20 along aisle 16 and along the corridors 14 in order to transport them between the movable storage racks 23 and the stationary storage racks 12.

As best seen in FIGS. 3 and 4, robot 50 comprises first rails 52, 53, 54, 55, which extend parallel to aisle 16. In the embodiment shown, these rails are located above or at the top of the stationary storage racks 12. In addition, or alternatively thereto, there may be at least one first rail located at the bottom or below the stationary storage racks 12.

Robot 50 further comprises at least one second rail 56, 57, which extends perpendicularly to the first rails 52-55 and parallel to the corridors 14. In the embodiment shown, there are two such second rails 56, 57 located on opposite sides of aisle 16, with one attributed to each of the rows of the stationary storage racks 12.

The second rails 56, 57 can be displaced, advantageously independently of each other, along the first rails 52, 53, 54, 55.

In the embodiment shown, the second rails 56, 57 are located above the stationary storage racks 12. Alternatively, or in addition thereto, they may also be located below the stationary storage racks 12.

Robot 50 further comprises one or more lift device(s) 60. Each such lift device 60 is mounted to at least one second rail 56, 57 and is displaceable along it.

In the shown embodiment, there are two such lift device is 60 on opposite sides of aisle 16, with one lift device 60 attributed to each of the rows of the stationary storage racks 12.

A carrier handler 62 is mounted in vertically displaceable manner on each lift device 60 (see FIG. 5). Carrier handler 62 is adapted to manipulate a carrier 20. For this purpose, it e.g. comprises a scoop or gripper 64 for engaging carrier 20.

For example, and as shown in FIG. 5, carrier handler 62 can comprise a scoop that can be displaced into the storage locations 18, 24 in order to engage the carrier 20 from below, scooping it up.

By moving the second rails 56, 57 along the first rails 52, 53, 54, 55 and by moving the lift devices 60 along the second rails 56, 57, the lift devices 60 can be moved to along corridors 14 as well as along aisle 16. Thereby, and using its vertical displaceability, carrier handler 62 can move between any of the temporary, movable storage locations 24 of one of the movable storage racks 23 at one of the second locations 32, 33 and any of the permanent storage locations 18 in the stationary storage racks 12.

Access cabinet 4 forms an airlock between the environment and storage area 10. It is insulated, sealed, and maintained at a temperature below 20° C., in particular between −30° C. and +10° C. Common temperatures are around freezing point or around −20° C. Further, advantageously, the air within access cabinet 4 this being dried in order to reduce ice formation when opening product access door 40. In order to dry and/or to cool the atmosphere within cabinet 4, a suitable environmental control 62 can be provided.

At an outer wall of access cabinet 4, a door 68 is located, which allows a user to enter access cabinet 4.

The blood bank further comprises a user access door 70, which leads from cabinet 4 to storage area 10. User access door 70 is usually closed. It is used for maintenance.

Blood Bank, Second Embodiment

Figure 7:
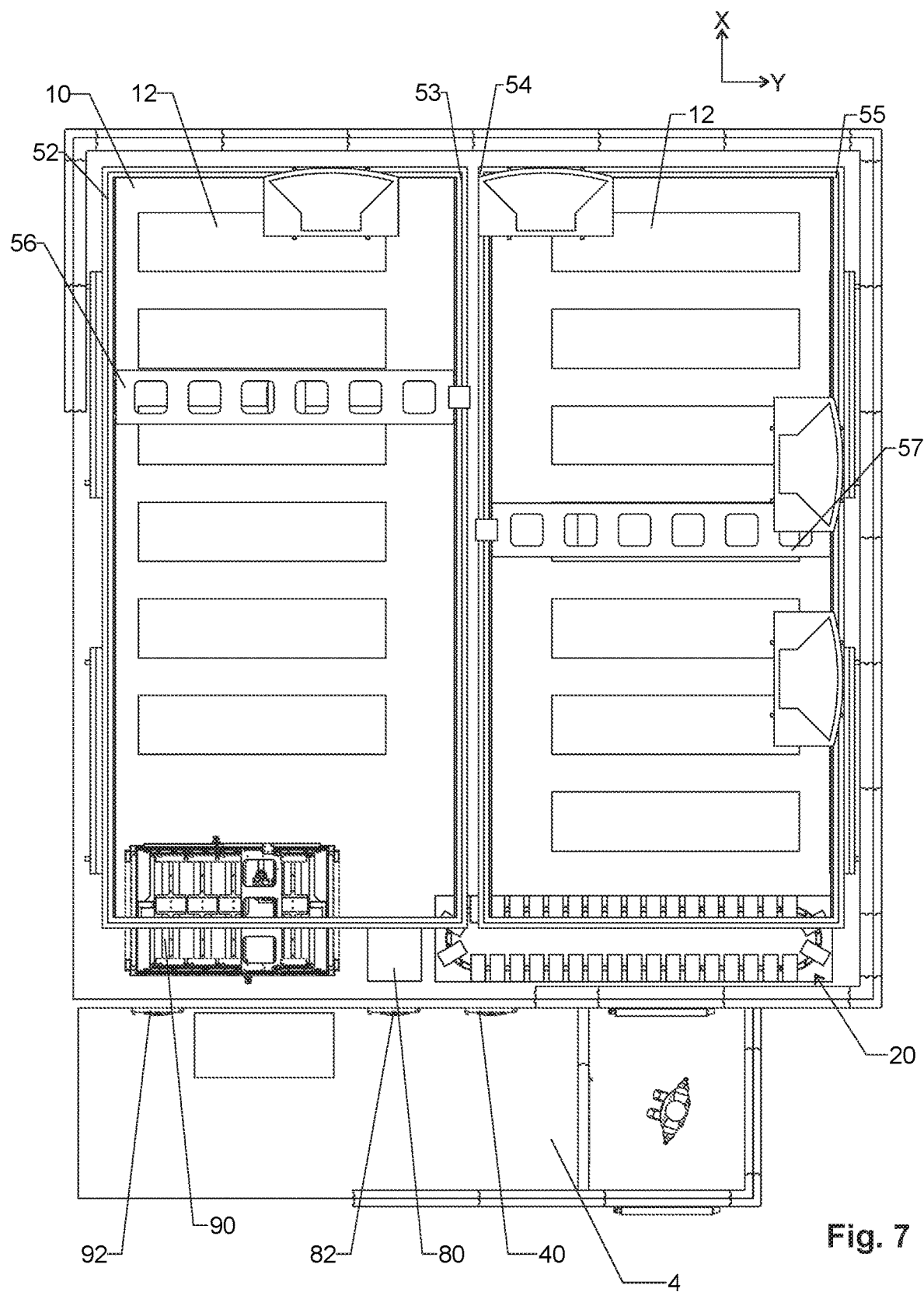
FIG. 7 shows a top view of the blood blank of FIG. 6, FIG. 8 a sectional view of a contact shock freezer (shown for clarity without its insulation).

FIGS. 6 and 7 show a second embodiment of a blood bank. It is basically of the same design as the first embodiment, comprising the same type of storage area 10 cooled to the same temperatures as the first embodiment and holding storage racks 12 arranged in rows and columns. There is again a robot 50 and a buffer storage 22.

However, in addition to the components of the first embodiment, the blood bank of the second embodiment comprises a shock freezer 80. This shock freezer is adapted and structured to shock-freeze blood products 21. In this context, "shock-freezing" is to be understood as freezing the blood products 21, in particular blood products 21 of a volume of at least 200 ml, in particular of at least 400 ml, from room temperature to a core temperature of less than −20° C. within a time span of less than 60 minutes.

Shock freezer 80 is advantageously a contact shock freezer where the blood product 21 is contacted from at least two sides (directly or through carrier 20) by at least two cold surfaces, see e.g. the device as described in DE 10 2007 052 014.

Figure 8:
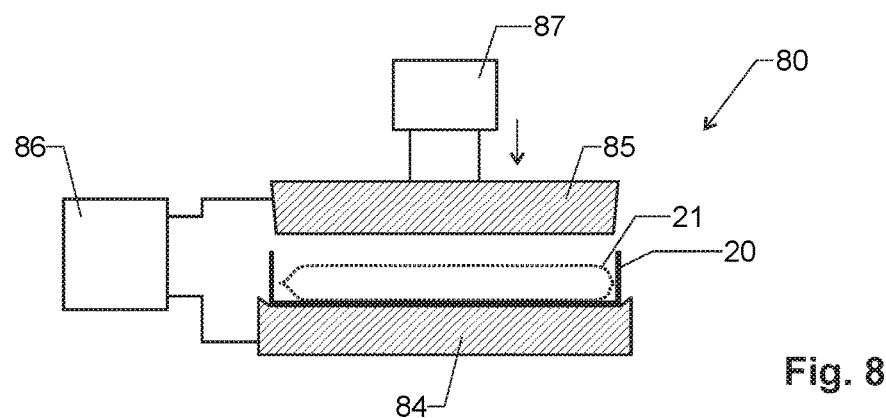

FIG. 8 shows an example of the freezing mechanism of shock freezer 80. In this embodiment, shock freezer 80 comprises a first and a second cooling block 84, 85. Each cooling block 84, 85 is connected to a cooling device 86 adapted and structured to cool the cooling blocks 84, 85 to a temperature of e.g. −50° C. or lower.

A displacement drive 87 is provided to move the cooling blocks 84, 85 against each other in order to make them contact two opposing sides of a blood product 21 between them, either directly or through carrier 20.

In the embodiment of FIG. 8, blood product 21 is shown to reside in carrier 20, with the lid (if any) removed therefrom. Thus, lower cooling block 84 contacts the bottom of carrier 20, while upper cooling block 85 contacts blood product 21 directly.

Advantageously, shock freezer 80 is arranged in storage area 10 and directly accessible from the outside of storage area 10, in particular from access cabinet 4, through a shock freezer door 82 separate from product access door 40. Shook freezer door 82 is arranged in a wall of storage area 10, and shock freezer 80 is arranged adjacent thereto. In other words, a user can place blood products directly into shock freezer 80 through shock freezer door 82.

Shock freezer 80 may be computer controlled to automatically shock-freeze the blood products 21 inserted therein and to forward them to robot 50 or buffer storage 22 when done.

In an advantageous embodiment, robot 50 is structured to access the frozen blood products in shock freezer 80 in order to move them to the storage locations in the storage racks 12.

In another embodiment, robot 50 and/or a separate transport mechanism can be provided for moving frozen blood products 21 from shock freezer 80 to buffer storage 22.

The second embodiment of the blood bank may also comprise a sample storage 90 arranged in storage area 10. Sample storage 90 comprises a plurality of storage locations for samples of a volume much smaller than the blood products 21, in particular for samples of a volume smaller than 10 ml, in particular a volume smaller than 2 ml. In other words, the storage vessels used for storing the samples have a volume of less than 10 ml, in particular of less than 2 ml.

It may comprise its own access device for storing and retrieving the individual samples automatically and can e.g. use the design of the storage device described in EP2208951.

Sample storage 90 is advantageously accessible, from outside of storage area 10, in particular from access cabinet 4, through a sample access door 92 separate from product access door 40 and separate from shock freezer door 82.

Sample access door 92 is arranged in a wall of storage area 10, and sample storage 90 is arranged adjacent thereto. In other words, a user can place samples directly into sample storage 90 through sample access door 92.

Advantageously, sample storage 90 comprises a plurality of tube racks holding test tubes for the samples.

Sample storage 90 may be used to store small amounts of the blood products stored in the storage racks 12 for testing purposes, e.g. for testing the suitability of a given blood product 21 for a given purpose.

Operation:

In order to store blood products 21 in the blood bank, the user can enter cabinet 4. Advantageously he places each blood product 21 into its own carrier 20. Then he opens product access door 40 and inserts the carriers 20 with the blood products 21 into the movable storage rack 23 in first location 30 adjacent to product access door 40.

Typically, the blood products 21 are provided with a machine-readable code, such as a bar code, which uniquely identifies the product.

After inserting the carriers 20 into at least one of the movable storage racks 23, the user closes product access door 40 and e.g. enters a command to store the loaded products.

Displacement device 26 is now operated to move any movable storage rack 23 that contains a product to be stored to one of the second locations 32, 33. From there, the products can be picked up by one of the carrier handlers 62 of robot 50 and be moved to a free permanent storage location 18 of the stationary storage racks 12.

Advantageously, buffer storage 22 has a capacity of at least 100 blood products, in particular of at least 500 blood products, i.e. there are at least 100, in particular at least 500, temporary, movable storage locations 24. Typically, there may e.g. be about 1000 temporary movable storage locations.

Access to the temporary movable storage locations 24 for loading and unloading them through access door 40 is much faster than the transfer between buffer storage 22 and the permanent storage locations 18.

Buffer storage 22 allows to increase the system's throughput by postponing the transferal of new blood products into the permanent storage locations 18 and/or be pre-fetching blood products from the permanent storage locations 18. In particular, the slow transfer between buffer storage 22 and the permanent storage locations 18 can take place even while no blood products are being loaded or unloaded through access door 40, e.g. at night.

In other words, buffer storage 22 is used as a temporary intermediate storage for the blood products 21. This allows to maintain (temporarily) a faster rate of transfer of the blood products 21 through product access door 40 than between buffer storage 22 and the stationary storage racks 12.

In particular, the transfer rate of blood products 21 through product access door 40 can be (temporarily, e.g. until exhaustion of the capacity of buffer storage 22) much faster than the transfer rate of blood products 21 between buffer storage 22 and the stationary storage racks 12. The former transfer rate can, for example, be at least five times faster, in particular at least ten times faster, than the latter transfer rate.

For example, the operation of robot 50 can continue through non-business hours (e.g. at night time) in order to empty buffer storage 22 of new blood products or to pre-fetch blood products from the storage racks 12 that well be needed in the future.

The blood bank can have a mode for fast product retrieval. In this mode, the user (or an external system) can specify a high-priority blood product to be retrieved quickly, in which case robot 50 will interrupt its continuous transfer of low-priority products between buffer storage 22 and the stationary storage racks 12 to retrieve the high-priority blood product from its storage location in the stationary storage racks 12. The high-priority blood product will be moved by robot 50 to a free location in buffer storage 22, and from there it will be moved to product access door 40. Alternatively, robot 50 can be structured to directly move the high-priority blood product to product access door 40 or to another door of storage area 10.

Carrier handler 62 is advantageously provided with a code reader to read the machine-readable code on the products 21. This information is recorded in a database, together with the permanent storage location 18 where the product is being stored, thereby allowing the product to be retrieved at a later time.

In order to retrieve one or more products from the blood bank, the user e.g. enters the identification code of the desired product(s) and issues a retrieval command. Upon receipt of this command, carrier handler 62 is moved to the respective permanent storage location 18 of the product to be retrieved in order to transport it to one of the temporary, movable storage locations 24 of one of the movable storage racks 23 in one of the second locations 32, 33.

If the user has issued a command to retrieve several products, this operation can be repeated until all the desired products are stored in the respective movable storage rack(s) 23.

Now, displacement device 26 is operated to move the movable storage rack 23 containing the desired product(s) to first location 30. The user can now open product access door 40 and retrieve the product(s).

When using the second embodiment of the blood bank, blood products can be introduced into the blood bank not only through buffer storage 22 but also through shock freezer 80, from where they are either directly forwarded to robot 50 or to buffer storage 22.

When storing a blood product in the bank of the second embodiment, the user can, at the same time, store a smaller amount of the product in sample storage 90 for later analysis.

Notes:

As mentioned, the blood bank comprises a storage area 10 maintained at low temperature. For a larger blood bank, storage area 10 can comprise several subsections, possibly separated by regions of higher temperature.

In the embodiment above, buffer storage 22 and robot 50 together form an automated transport device for moving the blood products. Their operations can be controlled by a suitable control unit of the blood bank. Electronically controllable drives are provided for moving transport device 26, the second rail(s) 55, 56, the lift device(s) 60 as well as the carrier handler(s) 62.

While there are shown and described presently preferred embodiments of the invention, it is to be distinctly understood that the invention is not limited thereto but may be otherwise variously embodied and practiced within the scope of the following claims.

The invention claimed is:

1. A blood bank comprising
a housing,
a storage area arranged in said housing,
a refrigerator device attributed to said storage area,
a plurality of stationary storage racks arranged in said storage area, each stationary storage rack comprising a plurality of permanent storage locations for blood containers arranged above each other,
a product access door arranged in a wall of said housing,
an automated transport device adapted and structured to transport blood containers between said product access door and said permanent storage locations,
wherein said transport device comprises:
a buffer storage arranged in said storage area at said product access door, wherein said buffer storage comprises a plurality of movable storage racks, each movable storage rack having a plurality of temporary, movable storage locations for blood containers arranged above each other, and
a robot movable between said movable storage racks and said stationary storage racks for transporting blood products between said temporary, movable storage locations and said permanent storage locations.

2. The blood bank of claim 1 wherein said buffer storage comprises a displacement device for moving said movable storage racks between a first location adjacent to said product access door and a second location, wherein said robot is movable to access blood products in a movable storage rack in said second location.

3. The blood bank of claim 2 wherein said displacement device is adapted and structured to move said movable storage racks along a looped path between said first and said second location, and in particular wherein said first and said second locations are at opposite sides of said buffer storage.

4. The blood bank of claim 3 wherein said looped path comprises a two parallel straight sections and two curved sections connecting said straight sections.

5. The blood bank of claim 1 wherein said stationary storage racks are arranged in at least two rows, with each row comprising a plurality of said stationary storage racks separated by corridors, and wherein said rows are separated by at least one aisle,
wherein said robot is adapted and structured to move said blood products along said aisle and said corridors.

6. The blood bank of claim 5 wherein said robot comprises
at least one first rail extending parallel to said aisle,
at least one second rail extending parallel to said corridors and being displaceable along said first rail(s),
at least one lift device mounted to said at least one second rail and being displaceable along said second rail, thereby being movable along at least part of said corridors and said aisle, and
a carrier handler mounted in vertically displaceable manner on said lift device.

7. The blood bank of claim 6 wherein said first rail(s) and/or said second rail(s) are mounted above or below said stationary storage racks.

8. The blood bank of claim 6 wherein said robot comprises a first and a second lift device located on opposite sides of said aisle.

9. The blood bank of claim 1 comprising a plurality of carriers, wherein each carrier is adapted and structured to receive a single blood product, and each one of said storage locations is adapted and structured to receive a single carrier with a blood product, and wherein said robot is adapted to transport at least one of said carriers at a time.

10. The blood bank of claim 1 comprising a closed cabinet arranged at an outside of said product access door, wherein said cabinet comprises an environmental control for cooling and/or drying an atmosphere within said cabinet.

11. The blood bank of claim 1 further comprising a shock freezer for the blood products, in particular a contact shock freezer.

12. The blood bank of claim 11 wherein said robot is adapted and structured to access frozen blood products in said shock freezer.

13. The blood bank of claim 11 further comprising, in addition to said product access door, a shock freezer door in a wall of said storage area, wherein said shock freezer is arranged adjacent to said shook freezer door.

14. The blood bank of claim 1 further comprising a sample storage arranged in said storage area with a plurality of storage locations for samples of a volume of less than 10 ml.

15. The blood bank of claim 14 further comprising, in addition to said product access door, a sample access door in a wall of said storage area, wherein said sample storage is arranged adjacent to said sample access door.

16. The blood bank of claim 1 comprising at least 100, in particular at least 500, temporary, movable storage locations.

17. A method for operating the blood bank of claim 1 comprising the step of using said buffer storage as temporary intermediate storage for said blood products while maintaining a faster rate of transfer of the blood products through said product access door than between said buffer storage and said stationary storage racks.

18. The method of claim 17 comprising the step of transferring, in a given time span, at least five times more of said blood products through said product access door than between said buffer storage and said stationary storage racks.

19. A blood bank comprising
a housing;
a storage area arranged in said housing;
a refrigerator device attributed to said storage area;
a plurality of stationary storage racks separated by corridors arranged in said storage area, each stationary storage rack comprising a plurality of permanent storage locations for blood containers arranged above each other;
a product access door arranged in a wall of said housing;
a buffer storage arranged in said storage area adjacent said product access door, said buffer storage comprising a plurality of horizontally movable storage racks, each movable storage rack having a plurality of temporary, movable storage locations for blood containers arranged above each other, and
a robot movable between said movable storage racks and said stationary storage racks, said robot being configured to transport blood products between said temporary, movable storage locations and said permanent storage locations.

20. The blood bank of claim 1, wherein:
said movable storage racks are configured to move along a looped path;
at least one lift device arranged on the robot; and
a vertically displaceable carrier handler mounted to the at least one lift device.

* * * * *